United States Patent
Panda et al.

(10) Patent No.: US 12,254,034 B2
(45) Date of Patent: Mar. 18, 2025

(54) SEARCHING AND LOCATING ANSWERS TO NATURAL LANGUAGE QUESTIONS IN TABLES WITHIN DOCUMENTS

(71) Applicant: Microsoft Technology Licensing, LLC, Redmond, WA (US)

(72) Inventors: Sarah Panda, Bothell, WA (US); Arindam Mitra, Redmond, WA (US); Liang Du, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/833,406

(22) Filed: Jun. 6, 2022

(65) Prior Publication Data

US 2023/0394074 A1 Dec. 7, 2023

(51) Int. Cl.
G06F 16/33 (2019.01)
G06F 16/3329 (2025.01)
G06F 16/334 (2025.01)
G06F 16/338 (2019.01)

(52) U.S. Cl.
CPC ...... *G06F 16/3344* (2019.01); *G06F 16/3329* (2019.01); *G06F 16/338* (2019.01)

(58) Field of Classification Search
CPC .................................................. G06F 16/3344
See application file for complete search history.

(56) References Cited

U.S. PATENT DOCUMENTS

| | | | | |
|---|---|---|---|---|
| 2005/0197990 A1* | 9/2005 | Wu | ........................ | G06F 16/256 706/48 |
| 2014/0149390 A1* | 5/2014 | Chen | .................... | G06F 16/9038 707/722 |
| 2017/0060945 A1 | 3/2017 | Bastide et al. | | |
| 2017/0315979 A1* | 11/2017 | Boucher | ................ | G06F 40/197 |
| 2019/0065502 A1* | 2/2019 | Lee | ........................ | G06F 16/951 |
| 2022/0044134 A1* | 2/2022 | Joy | ........................ | G06N 3/045 |
| 2023/0177266 A1* | 6/2023 | Ihara | ..................... | G06F 40/258 704/9 |
| 2023/0237040 A1* | 7/2023 | Thompson | ........... | G06V 30/413 382/159 |

OTHER PUBLICATIONS

Jain, et al., "A Review of Unstructured Data Analysis and Parsing Methods", In Proceedings of International Conference on Emerging Smart Computing and Informatics, Mar. 12, 2020, pp. 164-169.

"International Search Report and Written Opinion Issued in PCT Application No. PCT/US23/021788", Mailed Date: Jul. 20, 2023, 12 Pages.

Perez-Arriaga, et al., "TAO: System for Table Detection and Extraction from PDF Documents", In Proceedings of the Twenty-Ninth International Florida Artificial Intelligence Research Society Conference, Jan. 2016, pp. 591-596.

\* cited by examiner

*Primary Examiner* — Van H Oberly
(74) *Attorney, Agent, or Firm* — RAY QUINNEY & NEBEKER; Tiffany Healy

(57) ABSTRACT

The present disclosure relates to methods and systems for searching and finding one or more tables that contain an answer to a query within documents. The methods and systems receive the query with query terms and search a table index for one or more related tables to the query terms. The methods and systems locate an answer to the query in the cells of the related tables and provide an output with the answer highlighted in the cells of the related tables in response to the query.

20 Claims, 6 Drawing Sheets

SEARCHING AND LOCATING ANSWERS TO NATURAL LANGUAGE QUESTIONS IN TABLES WITHIN DOCUMENTS

BACKGROUND

Portable document format (PDF) documents are one of the most widely used document formats to share information over the internet. Typically, when a user has a question, current solutions may search the text of PDF documents for answers to the questions. The text of the PDF documents is generally unstructured, and thus, locating the answers to the questions is typically performed by analyzing the plain text of the PDF documents.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving a query with query terms. The method includes searching a table index for one or more related tables to the query terms, wherein the table index is generated for a set of documents. The method includes locating an answer to the query in at least one table of the one or more related tables and identifying a document for the at least one table. The method includes providing an output with the answer highlighted in the at least one table in the document.

Some implementations relate to a device. The device includes one or more processors; memory in electronic communication with the one or more processors; and instructions stored in the memory, the instructions executable by the one or more processors to: receive a query with query terms; search a table index for one or more related tables to the query terms, wherein the table index is generated for a set of documents; locate an answer to the query in at least one table of the one or more related tables and identifying a document for the at least one table; and provide an output with the answer highlighted in the at least one table in the document.

Some implementations relate to a method. The method includes parsing a set of documents to identify tables within the set of documents. The method includes generating a table index for the tables. The method includes receiving a query with query terms. The method includes searching the table index for related tables to the query terms. The method includes locating an answer to the query in one or more tables in the related tables. The method includes providing an output with the answer highlighted in the one or more tables in at least one document of the set of documents.

Some implementations relate to a device. The device includes one or more processors; memory in electronic communication with the one or more processors; and instructions stored in the memory, the instructions executable by the one or more processors to: parse a set of documents to identify tables within the set of documents; generate a table index for the tables; receive a query with query terms; search the table index for related tables to the query terms; locate an answer to the query in one or more tables in the related tables; and provide an output with the answer highlighted in the one or more tables in at least one document of the set of documents.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
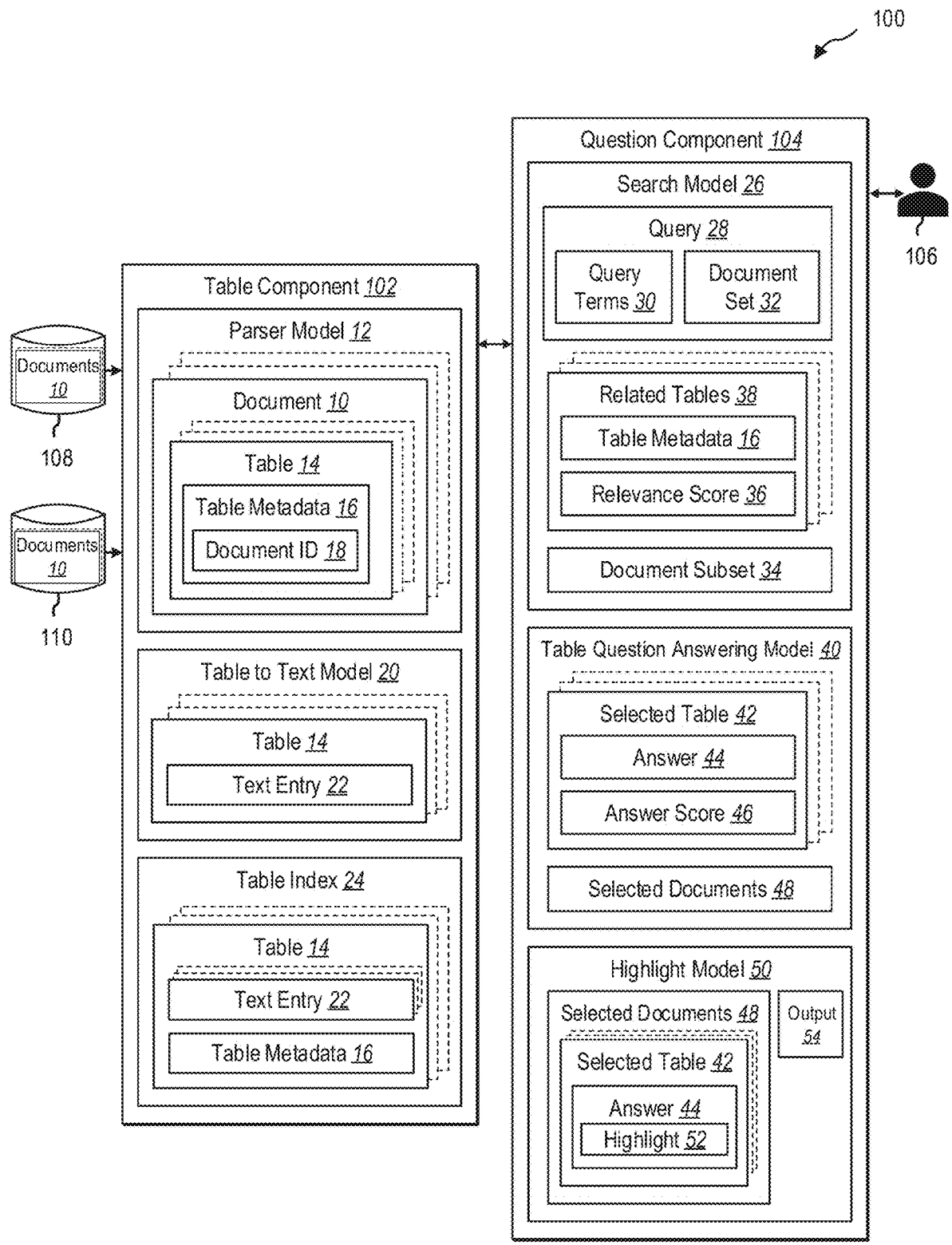
FIG. 1 illustrates an example environment for searching tables within documents for answers to queries in accordance with implementations of the present disclosure.

This disclosure generally relates to searching tables within documents for answers to questions. When a user has a question, current solutions receive the question and may search the text of the documents for the answers to the question. The text of the documents is generally unstructured, and thus, locating the answers to the questions is typically performed by analyzing the plain text of the documents.

The present disclosure includes methods and systems for providing an end-to-end experience for searching answers to generic natural language questions in tables within documents. A table is an arrangement of information or data, typically in rows and columns, or possibly in a more complex structure. The table headings provide an explanation for the information in the different cells of the table. Moreover, the information in the rows and the columns may have different relationships. As such, the data in tables is typically structured. The methods and systems enable users to search and find a relevant table within multiple PDF documents that contains an answer to a question and to visually see the answer by highlighting the cell or multiple cells within the document that form the answer.

The methods and systems receive a natural language question from a user and access a set of documents to provide an answer the question using one or more tables in the documents. The methods and systems perform a search through the tables within the different documents to identify any relevant tables with answers to the question. The methods and systems highlight the relevant table(s) within the documents and provide as an output the highlighted tables in response to the question.

In some implementations, the documents are PDF documents. The methods and systems search and find a relevant table within multiple PDF documents that contain the answer to a question. A parser model extracts the content of the PDF documents and tabular data for use in generating a table index for the PDF documents. When a query comes in, a search model searches the table index for a table that may contain the answer to the query. Once there is a table matching the query with a high enough relevance score, a table question answering model, that understands the semantics of the question and the relations and semantic information in tables, is called with the table that may contain the answer to the query as an input to locate the answer in the form of cells within the table. The methods and systems present the results using a highlight feature that highlights all the cells within that PDF that compose the answer. In some implementations, the methods and systems show the actual answer on hovering over the cells of the table, after applying any necessary aggregation operations to the cells of the table. In some implementations, if the table question answering model does not provide an answer with a high enough confidence, the methods and systems highlight the entire table as a suggested source of the answer.

The methods and systems may be applied to any domain. The highlighted answers from the tables may be used in applications and/or other processing tasks. For example, applications that handle a task of finding answers in text may also use the highlighted answers from tables in providing the answers to questions. The highlighted answers from tables may also be used in other natural language processing based products to provide additional functionality and/or processing capabilities to the natural language processing products.

One example use case includes using a specially trained and finetuned table question answering machine learning model for medical domain dataset created through a labeling task. As such, the table question answering model navigates information in tables in medical documents and provides answers found in tables within medical documents to questions relating to medical issues.

Another example use case includes a student working on a school project. The student may ask different questions for the project. The table and answering model navigates information in tables within different PDF documents and highlights the answers to the questions found in the tables within the PDF documents. The student may use the highlighted tables with the answers in the school project.

Another example use case includes an employee working on a presentation for a business group. The table and answering model searches information in tables within different documents related to the business group and highlights the answers to different questions asked. The different tables may be easily identified for use with the presentation.

One technical advantage of the methods and systems of the present disclosure is identifying tables within documents that provide answers to questions. Another technical advantage of the methods and systems of the present disclosure is the capability of highlighting results within documents or the table itself depending on a confidence score, resulting in an elegant end to end experience. Another technical advantage of the methods and systems of the present disclosure is searching within cells of tables for answers to natural language questions. Another technical advantage of the methods and systems of the present disclosure is an improvement in the searchable performance of tables. Another technical advantage of the methods and systems of the present disclosure is reducing an amount of time to locate an answer to a question, particularly when the answer to the question lies in the tables within the documents rather than the raw text of the document, and thus, easing the amount of time it takes users to process and read through lots of documents to find the answers. Generally, search or question answering in tables are research problems that are explored independently. The methods and systems of the present disclosure combines these two areas (search and question answering in tables) and adds visualization to enable an end to end user friendly experience. The methods and systems may be applied to any domain. In some implementations, the domain is the medical domain.

As such, the methods and systems parse a set of documents, extract the tables from the documents, perform a table understanding, and perform the table question and answering on the searched question to identify tables that answer received questions. The methods and systems add visualization to highlight the cells of the tables or the tables in the documents that contain the answer to the questions, and thus, enables an end to end user friendly experience for asking questions and receiving answers to the questions.

Referring now to FIG. 1, illustrated is an example environment 100 for searching tables 14 within documents 10 to find a relevant table that contains an answer to a question. The environment 100 may include one or more datastores 108, 110 with documents 10. The documents 10 may include any PDF document or other text document that contains text, figures, and/or tables.

The environment 100 may include a parser model 12 that obtains the documents 10 and extracts the content of the documents 10 to identify one or more tables 14 within the documents 10. One example use case includes a first document with 8 tables 14 and a second document with 20 tables 14. The parser model 12 identifies the 8 different tables 14 for the first document and identifies the 20 different tables 14 for the second document. A table 14 is an arrangement of information or data, typically in rows and columns. The rows and columns include table cells. Each cell contains information (e.g., text, values, or images) relating to the combination of the rows and columns. The headings in the table 14 provide an explanation for the information in the different cells of the table 14. Moreover, the information in the rows and the columns may have different relationships. In some implementations, the documents 10 are obtained from the one or more datastores 108, 110. In some implementations, the documents 10 are uploaded by a user 106.

The parser model 12 identifies table metadata 16 for each table 14 identified in the documents 10. The table metadata 16 includes any information regarding the table 14. The table metadata 16 includes the text or values of cells within the table 14. The table metadata 16 also identifies the number of rows and columns in the table 14. The table metadata 16 also provides information about the title of the table 14, headings of the rows or columns of the table 14, and/or captions of the table 14.

In addition, the table metadata 16 provides location information of the table 14 in the document 10. For example, the location information includes a page number, a page height, a page width, and/or cartesian coordinate values of the corners of the table 14 (e.g., the x-axis and y-axis coordinate location of the top right corner of the table, the top left corner of the table, the bottom right corner of the table, and the bottom left corner of the table). The location information is used to identify a location on a page within the document 10 of the identified table 14. The table metadata 16 also includes a document identification (ID) 18 of the document 10 where the table 14 is located. The document ID 18 is associated with the table 14 and may be used to identify which document 10 includes the table 14.

The parser model 12 provides the tables 14 and the table metadata 16 to the table to text model 20. The table to text model 20 creates text entries 22 for each table 14 and produces a table index 24 that may be searched. The text entries 22 provide a mechanism to search the table 14 based on the content of the table 14. The text entries 22 provide a context to the information (e.g., text, values, and/or images) within the cells of the table 14. For example, the text entries 22 provide a description of the information contained within in the row or column. The text entries 22 may be used to identify a structure of the table 14 and/or the relationships between the rows and columns. The text entries 22 may use captions, titles, and/or headings to provide context to the information within the cells of the table 14.

Each table 14 identified by the parser model 12 may include a plurality of text entries 22. For example, each row of the table 14 has a different text entry 22 with the text or values obtained for each row. Another example includes additional text entries 22 for each row with additional description providing a context of the text or values. Another example includes a text entry 22 with an overall context of the table 14 obtained from the caption of the table 14 or a title of the table 14. Another example includes each column of the table 14 having a different text entry 22 with the text or values obtained for each column. Another example includes additional text entries 22 for each column with additional description providing a context of the text or values. As such, each table 14 is saved in multiple ways using different text entries 22 to provide a description of the information contained within each cell of the table 14. Moreover, by saving the table 14 in multiple forms, the table 14 has a higher chance of overlap with query terms 30.

The text entries 22 are used to produce a table index 24 that may be searched based on the content (e.g., the information in the cells) of the table 14 and/or a context of the table 14. The table to text model 20 converts every table 14 identified by the parser model 12 into a table index 24.

In some implementations, different table indexes 24 may be generated for different domains or groups of documents 10. For example, a table index 24 is generated for medical documents. Another example includes a table index 24 generated for sports documents. Another example includes a table index 24 generated for financial documents. In some implementations, a single table index 24 is generated for the documents 10 regardless of the domain or genre of the documents 10.

The table index 24 is stored and different searches may be performed on the table index 24. The table metadata 16 of the tables 14 is also stored with the text entries 22. The table metadata 16 is used to identify the document IDs 18 of the documents 10 associated with the text entries 22. As such, the documents 10 that contain the tables 14 may be identified from the table index 24 using the table metadata 16. The table index 24 may be updated as new documents 10 are added or additional documents 10 are accessed by the table component 102.

The user 106 may interact with the question component 104 to provide one or more queries 28 with questions that the user 106 is asking. For example, the user 106 may access the question component 104 using a device and may provide the queries 28 using the device (e.g., typing the query 28 on a search screen or speaking the query 28 into the device). In some implementations, an application provides the question component 104 and the user 106 accesses the application using the device.

The question component 104 includes a search model 26 that receives one or more queries 28 from the user 106. The queries 28 are natural language queries. The queries 28 include query terms 30. The query terms 30 may form a question that the user 106 is asking.

In some implementations, the search model 26 receives an identification of the document set 32 to use for answering the question asked in the query 28. For example, the user 106 provides an identification within the query 28 of the document set 32 to use. Another example includes the user 106 uploading local documents 10 or otherwise providing the documents 10 for the document set 32. Another example includes the user 106 selecting the document set 32 from a list of documents 10 available for use (e.g., a list of documents 10 in the datastores 108, 110). In some implementations, the search model 26 automatically identifies the document set 32 to use for the query 28 based on the query terms 30.

The search model 26 accesses the table index 24 associated with the document set 32 and executes a search on the table index 24 using the query terms 30. For example, the search model 26 identifies the table index 24 associated with the document IDs 18 of the document set 32. Another example includes the search model 26 identifying the table index 24 associated with a genre or domain of the document set 32. For example, if the document set 32 is for the medical domain, the search model 26 identifies the table index 24 generated for the medical domain documents 10.

The search model 26 compares the query terms 30 to the text entries 22 in the table index 24 to identify one or more related tables 38 to the query terms 30. The related tables 38 may be a subset of the tables 14 that may have an answer to the query 28. For example, the search model 26 identifies text entries 22 in the table index 24 with a percentage of words or values that match the query terms 30. Another example includes the search model 26 identifying text entries 22 in the table index 24 with words or values that are similar to the query terms 30.

The search model 26 may select the related tables 38 based on a relevance score 36. In some implementations, the search model 26 determines a relevance score 36 for the one or more related tables 38 based on a percentage of the words or values from the text entries 22 matching the query terms 30 or a percentage of the words or values from the text entries 22 being similar to the query terms 30. A higher relevance score 36 indicates a higher probability that the words or values from the text entries 22 may be relevant to the query terms 30. For example, a high relevance score 36 indicates that there is an 85% match in the content of the text entries 22 and the query terms 30 based on a chosen algorithm. A lower relevance score 36 indicates a lower probability that the text entries 22 are related to the query terms 30. For example, a lower relevance score 36 includes 40% of the words or values from the text entries 22 do not match the query terms 30.

In some implementations, the search model 26 may set a threshold level for the relevance score 36 and the search model 26 may select the related tables 38 in response to the threshold level being equal to or exceeding the threshold level. The search model 26 may rank the tables 14 by the relevance score 36 and may compare the relevance scores 36 to the threshold level in determining whether to add a table 14 to the related tables 38 subset. For example, if the threshold level is 75% and the relevance score 36 for a text entry 22 for a table 14 is 90%, the search model 26 selects the table 14 as a related table 38 that may include an answer to the query 28. Another example includes if the threshold level is 80% and the relevance score 36 for a text entry 22 for a table 14 is 60%, the search model 26 may not add the table 14 to the related tables 38 since the relevance score 36 indicates a lower probability that the table 14 includes an answer to the query 28. In some implementations, the search model 26 may limit the number of tables 14 to include in the related tables 38 subset. One example may include setting the limit to 10 tables and the 10 tables 14 with the highest relevance score 36 may be added to the related tables 38.

The search model 26 may obtain the table metadata 16 from the table index 24 for the related tables 38 and may also identify the document ID 18 associated with the related tables 38. The search model 26 may identify a document subset 34 based on the document IDs 18 associated with the related tables 38. The document subset 34 includes the documents 10 associated with the document IDs 18 for the related tables 38. The search model 26 may rank the documents 10 included in the document subset 34 based on the relevance score 36 of the related tables 38. In some implementations, the search model 26 may set a limit for the number of documents 10 to include in the document subset 34. For example, the limit is 12 documents and the 12 documents with the related tables 38 with the highest relevance scores 36 may be added to the document sub set 34.

A table question answering model 40 may receive the document subset 34 with the related tables 38 and the table metadata 16 from the search model 26 and perform a fine grained search of the related tables 38 to determine which related tables 38 and/or cells of the related tables 38 provide an answer 44 to the query 28. The table question answering model 40 understands the semantics of the question in the query 28 and the relations and semantic information in the related tables 38. The table question answering model 40 analyzes the related tables 38 to determine whether the cells of the related tables 38 contain an answer 44 to the query 28. As such, the table question answering model 40 locates the answer 44 in the form of cells within the related tables 38.

The table question answering model 40 uses the table metadata 16 to determine position embeddings, column embeddings, row embeddings, and/or segment embeddings of the cells to determine the relationship between the cells of the related table 38. The table question answering model 40 also uses the position of the cell in relationship to a header of the column and/or a row of the cell to determine a context of the cell. As such, the table question answering model 40 captures the relationship and/or a context of the cells based on a position of the cell in the related table 38. For each related table 38, the question answering model 38 analyzes the content of the cells based on the relationship and/or a context of the cell to determine whether the cell provides an answer 44 to the query 28.

The table question answering model 40 uses the information of the cell (e.g., text or value of the cell) in combination with the context of the cell (e.g., the relationship information and/or a position of the cell) to determine whether the information of the cell provides the answer 44 the query 28. The final answer 44 may be composed of one or more cells within the table 14, and the one or more cells with the final answer 44 are highlighted.

The table question answering model 40 provides an answer score 46 that identifies a level of confidence that one or more cells of the selected table 42 provides a correct answer 44 to the query 28. A low answer score 46 indicates that the table question answering model 40 was unable to locate the answer 44 in one or more cells of the related tables 38 or a lower probability that the answer 44 is a correct answer. A high answer score 46 may indicate that the table question answering model 40 located a correct answer 44 in one or more cells of the related tables 38 or a high probability the answer 44 is in one or more cells of the related tables 38.

The table question answering model 40 selects one or more related tables 38 based on the answer score 46. For example, the selected table 42 is the related table 38 with a highest answer score 46. In some implementations, the table question answering model 40 ranks the one or more related tables 38 based on the answer score 46 and sets a threshold level for the answer score 46. The selected tables 42 may include the related tables 38 with answer scores 46 that are equal to the threshold level or exceed the threshold level. For example, if the threshold level is 95%, the selected tables 42 include the related tables 38 with an answer score 46 that is equal to or exceeds 95%. The table question answering model 40 identifies one or more cells of the selected tables 42 that include the answer 44.

In some implementations, the selected tables 42 may include related tables 38 with an answer score 46 below the threshold level. For example, if none of the related tables 38 have an answer score 46 equal to or above the threshold level, the selected table 42 may include a related table 38 that has a high relevance score 36 (e.g., the content of the related table 38 may not provide the answer 44 to the query 28 but the content is highly relevant to the query 28). The table question answering model 40 may identify majority of the cells or all cells of the selected tables 42 as being related to the answer 44.

A highlight model 50 receives the selected tables 42 and the identified cells of the selected tables 42 that include the answer 44 or are related to the answer 44. For example, the highlight model 50 receives a table ID and a cell ID of the selected tables 42 and the identified cells that contain the answer 44. The highlight model 50 obtains the table metadata 16 for the selected tables 42. The highlight model 50 uses the table metadata 16 to select the documents 10 for the selected tables 42 based on the document ID 18 from the table metadata 16. The selected documents 48 include the one or more documents 10 that include the selected tables 42.

The highlight model 50 determines a position of the selected tables 42 and the identified cells that include the answer 44 in the selected documents 48. The highlight model 50 uses the table metadata to 16 identify a location of the selected tables 42 in the selected documents 48 and a position of the one or more cells with the answer 44. For example, the table question answering model 40 uses position embeddings, column embeddings, row embeddings, and/or segment embeddings of the cells in relation to the location of the selected table 42 in the selected document 48 to determine the location of the one or more cells with the answer 44.

The highlight model 50 applies a highlight 52 to the one or more cells of the selected table 42 that contains the answer 44 based on the determined position of the selected table 42 and the determined position of the one or more cells with the answer 44. The highlight 52 visually distinguishes the one or more cells that contain the answer 44 relative to the other information in the selected table 42.

One example of the highlight 52 includes applying a highlighter (e.g., a color overlay) over the one or more cells that contain the answer 44. Another example of the highlight 52 includes underlining the information in the one or more cells that contain the answer 44. Another example of the highlight 52 includes changing a color of the text of the one or more cells that contain the answer 44. Another example of the highlight 52 includes applying a border to the one or more cells that contain the answer 44. Another example of the highlight 52 includes bolding the one or more cells that contain the answer 44.

The highlight model 50 may provide an output 54 with the selected documents 48 with the highlight 52 applied to the cells of the selected table 42 with the answer 44 to the query 28. As such, in response to providing the query 28, the user 106 receives the output 54 with the highlight 52 applied to one or more cells with the answer 44 to the query 28. The highlight 52 may visually distinguishes the one or more cells identified as containing the answer 44 to the query 28 or being related to the answer 44 of the query 28 so that a user may easily identify the one or more cells relative to other information in the selected document 48.

In some implementations, the highlight model 50 places the selected documents 48 in an order in the output 54 based on the answer score 46. As such, the user 106 may identify a document set 32 for use with the query 28 and may receive a subset of the document set 32, the selected documents 48 with the cells that contained the answer 44 sorted by the answer score 46. Each of the selected documents 48 includes one or more selected tables 42 with cells that provide an answer 44 to the query or that are related to the query highlighted.

One example use case includes the user 106 searching and finding answers 44 to queries 28 within multiple PDF documents 10 for the medical domain. The user 106 provides a plurality of queries 28 to the search model 26 and identifies medical domain PDF documents as the document set 32 to use for the queries 28. The question component 104 receives the plurality of queries 28 and the identified document set 32 and outputs a subset of the PDF documents (e.g., the selected documents 48 that contain selected tables 42 with answers 44 to the queries 28). The output 54 highlights the cells or multiple cells within the selected documents selected tables 42 that form the answer 44 in response to receiving the queries 28 from the user 106.

In some implementations, the parser model 12, the table to text model 20, the search model 26, the table question answering model 40, and the highlight model 50 are deep learning machine learning models. One example machine learning model is a natural language processing model, such as a bidirectional encoder representations from transformers (BERT) model to understand the semantics of the text. Another example machine learning model is a deep convolutional neural network (CNN) that may be used to understand other forms of data. Different combinations of machine learning models may be used for the different models (e.g., the parser model 12, the table to text model 20, the search model 26, the table question answering model 40, and the highlight model 50 may have different machine learning models). For example, the search model 26 may be a BM25 algorithm over an index created with a BERT model and the parser model 12 may be a combination of an optical character recognition (OCR) model to parse the text and tables and other a deep neural network (DNN) models to extract the figures.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the table component 102, the question component 104 and the datastores 108, 110 are implemented wholly on the same computing device. Another example includes one or more subcomponents of the table component 102 (e.g., the parser model 12, the table to text model 20, and/or the table index 24) and the question component 104 (e.g., the search model 26, the table question answering model 40, and/or the highlight model 50) are implemented across multiple computing devices. Moreover, in some implementations, one or more subcomponent of the table component 102 and the question component 104 may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

The environment 100 provides an end-to-end experience to the users 106 for searching for answers 44 to generic natural language queries 28 in tables 14 within the documents 10. The environment 100 enables the users 106 to search and find a table (e.g., the selected table 42) that contains an answer 44 to a query 28 within multiple documents 10. The environment 100 selects the document 10 with the table (e.g., the selected document 48) and provides an output 54 with the answer 44 by highlighting the cell or multiple cells of the tables (e.g., the selected tables 42) that form the answer 44 within the selected document 48 so that the user 106 may visually see the answer 44. The environment 100 reduces an amount of time the users 106 spend reading through multiple documents 10 to find the answers 44 by automatically locating the answers 44 to the questions provided in the queries 28 when the answers 44 lie in the tables 14 of the documents 10 rather than the raw text of the documents 10.

Figures 2A, 2B:
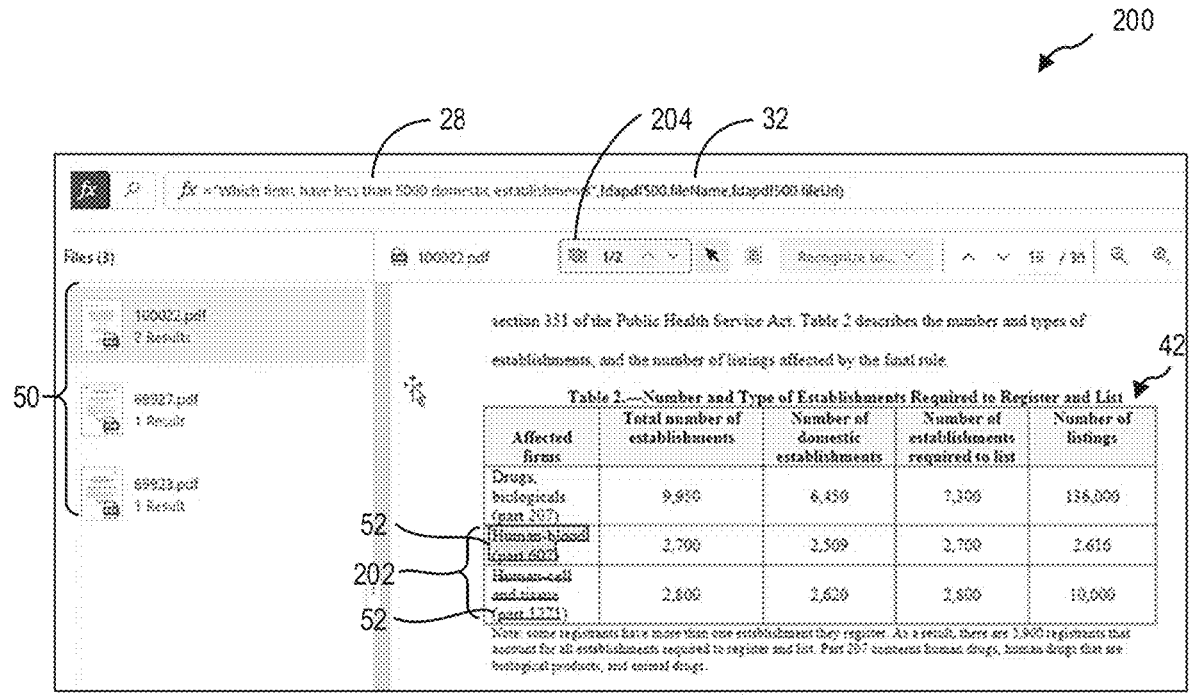
FIG. 2A illustrates an example graphical user interface of an output with a highlighted table in accordance with implementations of the present disclosure.
FIG. 2B illustrates an example graphical user interface of an output with an answer to a query in accordance with implementations of the present disclosure.

Referring now to FIG. 2A, illustrated is an example graphical user interface 200 of an output 54 (FIG. 1) provided by a highlight model 50 (FIG. 1) for a query 28 received by the user 106 (FIG. 1). For example, the user 106 may access the question component 104 through an application on a device of the user 106 to provide the query 28 that the user 106 wants an answer for. In the illustrated example, the query 28 includes a question "which firms have less than 5000 domestic establishments." The query 28 also includes an identification of the document set 32 to use for searching for the answer to the query 28 (e.g., the file name and the file uniform resource locator (URL)). The question component 104 performs the processing discussed in FIG. 1 to identify the selected documents 48 with the selected tables 42 with one or more cells (e.g., highlighted cells 202) with the answer 44 (FIG. 1) to the query 28. The selected documents 48 may be presented in order of the answer score 46 for the selected table 42. For example, the 100022 document has a higher answer score 46 relative to the 69927 document and the 69923 document. The 69923 document has a lower answer score 46 relative to the 69927 document and the 100022 document.

The graphical user interface 200 may also indicate a number of selected tables 42 within each of the selected documents 48. For example, the 100022 document includes two selected tables 42 (e.g., two different tables within the 100022 document were identified as including an answer 44 to the query 28). Another example includes the 69923 document includes one selected table 42.

The 100022 document is highlighted and a first selected table 42 of the two selected tables in the 100022 document is presented on the graphical user interface 200. The selected table 42 includes two cells with highlights 52 (e.g., the highlighted cells 202). The highlights 52 include a color overlay and an underline. As such, two different cells in the selected table 42 had an answer 44 to the query 28 and the two different cells had different highlights 52 applied to the cells.

The user 106 may transition between the different selected tables 42 for the 100022 document by selecting the icon 204. Thus, the user 106 may easily navigate between the different selected tables 42 and view the highlighted cells 202 with the answer 44 to the query 28 of the different selected tables 42. In addition, the user 106 may easily navigate through the different selected documents 48 by selecting a different document, the 69923 document, and the selected table 42 for the 69923 document is displayed.

The graphical user interface 200 enable the users 106 to search and find a relevant table within multiple PDF documents (e.g., the document set 32) that contains an answer 44 to a question provided in a query 28 and to visually see the answer 44 by highlighting the cell or multiple cells (e.g., the highlighted cells 202) within the selected table 42 that form the answer 44. As such, the graphical user interface 200 enables an end to end user friendly experience for providing a query 28 with a question and viewing the answers 44 located in the selected table(s) 42 from the document set 32.

Referring now to FIG. 2B, illustrated is an example of an answer 44 provided in an output 54 by the highlight model 50 (FIG. 1) to a query 28 (FIG. 1) received from a user 106 (FIG. 1). In some implementations, a final answer 44 to the query 28 is presented upon the user 106 hovering or otherwise selecting the highlighted cells 202. The final answer 44 may identify the information (e.g., the text or values) from the highlighted cells 202. In addition, the final answer 44 may provide an answer score 46 (FIG. 1).

In some implementations, the highlight model 50 applies an aggregation operation to a plurality of cells identified as containing the answer in the selected table 42 to provide a final answer 44 to the user 106. The aggregation operation may include a sum, an average, a count, a maximum value, and/or a minimum value of the answers provided in the plurality of cells. For example, in the illustrated example, the user 106 asked a question "how many establishments had less than 5000." The highlight model may apply an aggregation function to the highlighted cells 202 and provide the final answer 44 of two establishments. The final answer 44 may be provided upon a hover of the highlighted cells 202.

Figure 3:
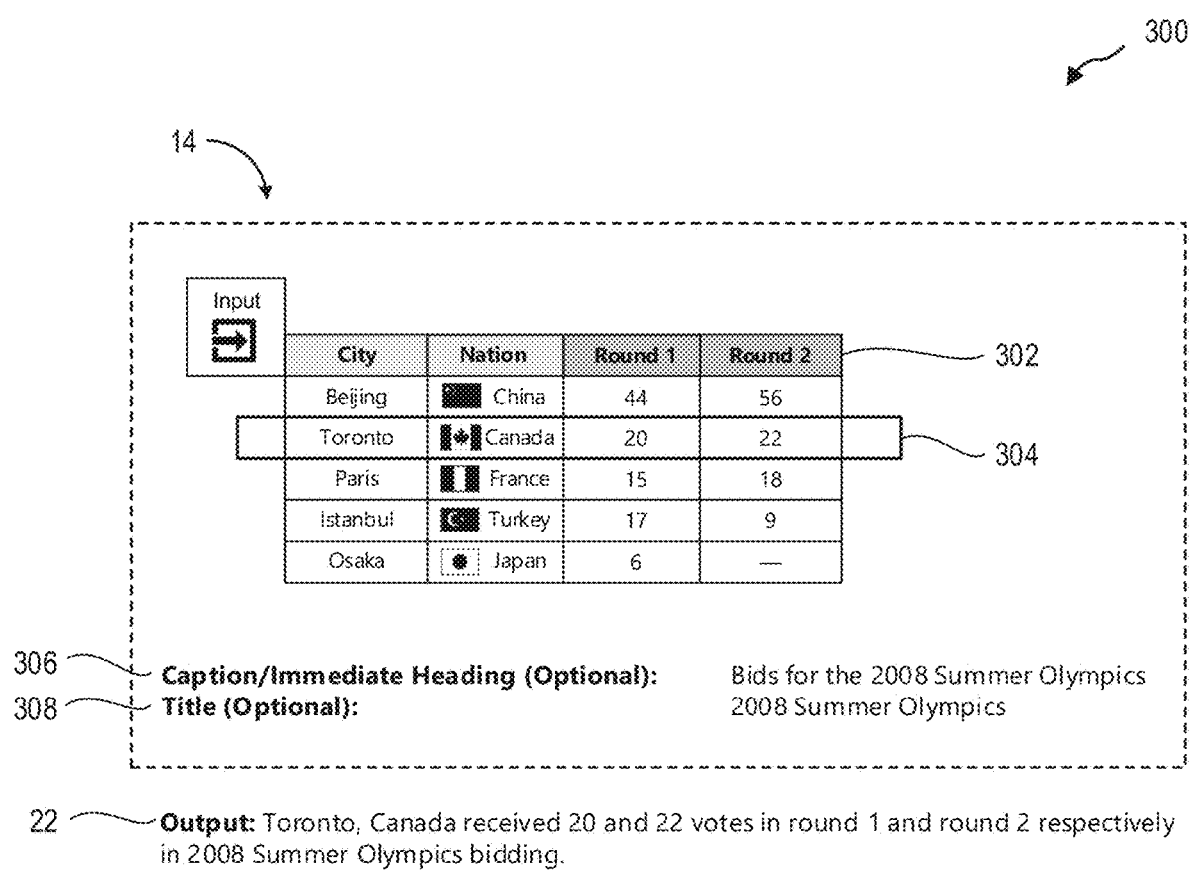
FIG. 3 illustrates an example graphical user interface of a text entry for a table in the table index in accordance with implementations of the present disclosure.

Referring now to FIG. 3, illustrated is an example graphical user interface 300 of a text entry 22 for a table 14 in the table index 24 (FIG. 1). The table 14 includes a caption 306 "bids for the 2008 Summer Olympics" and a title 308 "2008 Summer Olympics." The table 14 includes six rows and four columns. The row 302 is the heading that provides the context for the different columns. The first column is a city, and the second column is a nation. The third column is the number of votes for round 1 and the fourth column is the number of votes for round 2. The different rows of the table include the countries that provided bids for the 2008 Summer Olympics. The row 302, the caption 306, and the title 308 provide context information for the table 14 and help provide a structure of the table 14 and a relationship of the values of the different cells of the table 14.

The text to table model 20 may use the information provided by the caption 306, the title 308, and the column headings to determine the relationship of the different cells for each of the rows of the table 14. The text to table model 20 uses the information within each cell (e.g., the text, values, or images) in combination with the context information to determine the different text entries for the table 14.

One of the text entries 22 for the table 14 includes "Toronto, Canada received 20 and 22 votes in round 1 and round 2 respectively in 2008 Summer Olympics bidding" for the row 304. The text entry 22 provides the context to the information contained within the cells of the table 14 based on the heading information, the caption 306, and the title 308. The text entry 22 converts the information contained within the cells of the row 304 into searchable text and provides a context for the information of the different cells of the row 304. As such, the text entries 22 improves the searchability of the tables 14 while maintaining the structure and/or the relationship of the information provided in the different cells of the table 14. The table 14 may have different text entries for each row. In addition, the table 14 may have text entries for the caption 306 and/or the title 308. The text entries 22 for the table 14 are stored in the table index 24.

Figure 4:
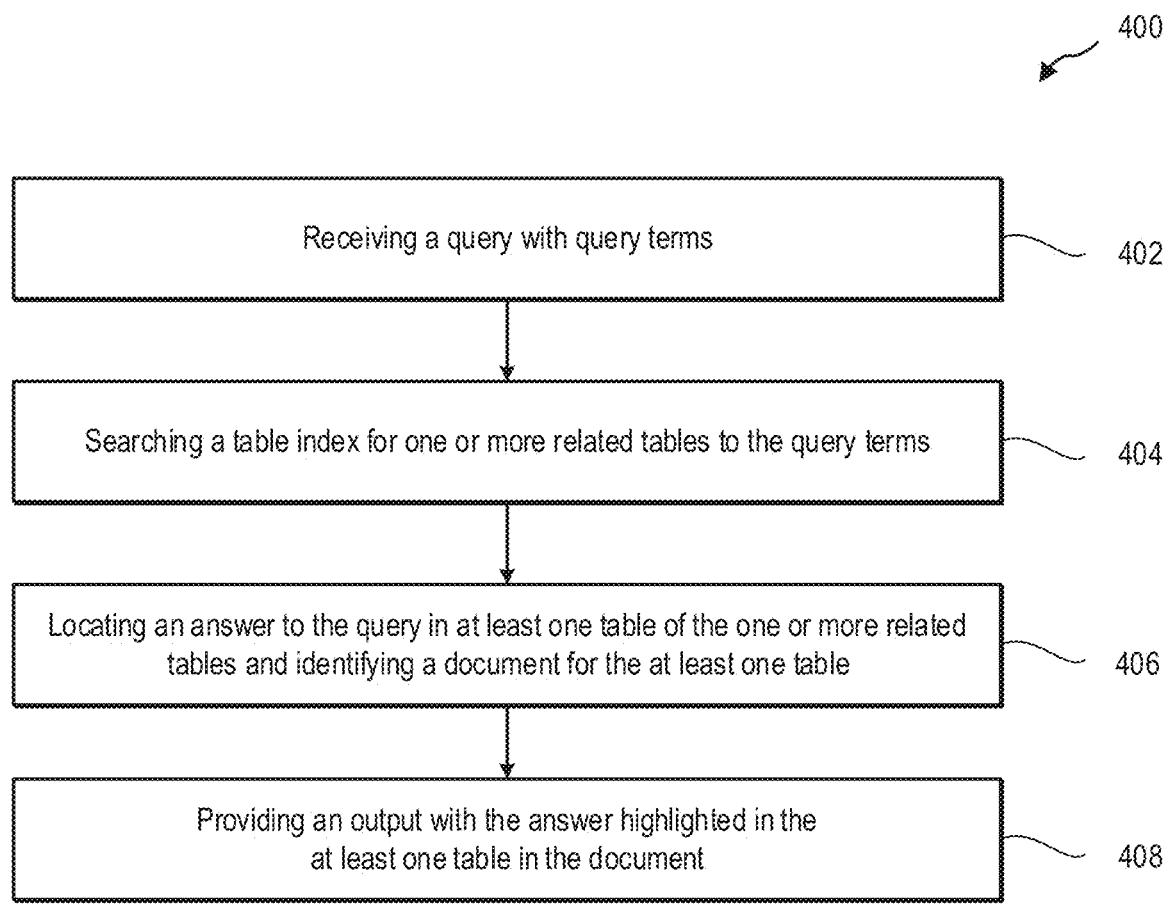
FIG. 4 illustrates an example method for searching tables within documents for answers to a query in accordance with implementations of the present disclosure.

Referring now to FIG. 4, illustrated is an example method 400 for searching tables within documents for answers to a query. The actions of the method 400 are discussed below with reference to the architecture of FIG. 1.

At 402, the method 400 includes receiving a query with query terms. The query 28 is a natural language query. A search model 26 receives a query 28 with query terms 30 from a user 106. The query terms 30 may form a question that the user 106 is asking.

At 404, the method 400 includes searching a table index for one or more related tables to the query terms. The search model 26 accesses the table index 24 associated with the document set 32 and executes a search on the table index 24 using the query terms 30. The search model 26 compares the query terms 30 to the text entries 22 in the table index 24 to identify one or more related tables 38 to the query terms 30. The related tables 38 may be a subset of the tables 14 that may have an answer to the query 28.

In some implementations, the table index 24 is generated for a set of documents (e.g., documents 10 or document set 32). The set of documents may include portable document format (PDF) documents with a table or other text documents that contain text, figures, and/or a table. In some implementations, the set of documents (e.g., documents 10 or document set 32) is identified with the query 28.

The table index 24 converts tables 14 identified in the set of documents (e.g., documents 10 or document set 32) into searchable text using a plurality of text entries 22 for each table 14. The text entries 22 provide a mechanism to search the table 14 based on the content of the table 14. The text entries 22 provide a context to the information (e.g., text, values, and/or images) within the cells of the table 14. For example, the text entries 22 provide a description of the information contained within in the row or column. The text entries 22 may be used to identify a structure of the table 14 and/or the relationships between the rows and columns. The text entries 22 may use captions, titles, and/or headings to provide context to the information within the cells of the table 14. The text entries 22 are used to produce a table index 24 that may be searched based on the content (e.g., the information in the cells) of the table 14 and/or a context of the table 14.

In some implementations, the table to text model 20 provides a relevance score 36 for the related tables 38 that indicates a confidence level that the related tables 38 include the query terms 30 or include text similar to the query terms 30. The search model 26 may set a threshold level for the relevance score 36 and the search model 26 may select the related tables 38 in response to the threshold level being equal to or exceeding the threshold level. The search model 26 may rank the tables 14 by the relevance score 36 and may compare the relevance scores 36 to the threshold level in determining whether to add a table 14 to the related tables 38 subset.

At 406, the method 400 includes locating an answer to the query in at least one table of the one or more related tables and identifying a document for the at least one table. In some implementations, the related tables 38 are provided to a table question answering model 40 to locate the answer 44 to the query 28 in one or more tables (e.g., the selected table 42). The table question answering model 40 is a deep learning machine learning model. In some implementations, the related tables 38 are provided to the table question answering model 40 in response to the relevance score 36 exceeding a threshold level.

The table question answering model 40 understands the semantics of the question in the query 28 and the relations and semantic information in the related tables 34. The table question answering model 40 analyzes the related tables 38 to determine whether the cells of the related tables 38 contain an answer 44 to the query 28. As such, the table question answering model 40 locates the answer 44 in the form of cells within the related tables 38. For each related table 38, the question answering model 38 analyzes the content of the cells based on the relationship and/or a context of the cell to determine whether the cell provides an answer 44 to the query 28.

The table question answering model 40 analyzes text or values of different cells of the related tables 38 based on a position of the cells in the related tables and relationships of the cells to determine if the cells provide the answer 44 to the query 28. The table question answering model 40 provides an answer score 46 that indicates a confidence level that the answer 44 is a correct result to the query 28. In some implementations, the table question answering model 40 provides the highlight model 50 an identification of a table (e.g., the selected table 42) with one or more cells that include the answer 44 in response to the answer score 46 exceeding a threshold level.

At 408, the method 400 includes providing an output with the answer highlighted in the at least one table in the document. A highlight model 50 receives the selected tables 42 and the identified cells of the selected tables 42 that include the answer 44 or are related to the answer 44. For example, the highlight model 50 receives a table ID and a cell ID of the selected tables 42 and the identified cells that contain the answer 44. The highlight model 50 obtains the table metadata 16 for the selected tables 42.

The highlight model 50 uses the table metadata 16 to identify a coordinate location of one or more cells with the answer 44 in the selected table 42 in the document (e.g., the selected document 48) to determine a position of the cells in the selected document 48. The highlight model 50 applies a highlight 52 to the cells of the selected table 42 in the document (e.g., the selected document 48) based on the determined position of the cells to visually distinguish the answer 44 in the cells. The highlight 52 includes applying a color overlay on the one or more cells, providing an underline, applying a border to the cells, changing a color of text or values of the cells, and/or bolding the text or values of the cells.

In some implementations, the highlight model 50 applies an aggregation operation of two or more cells that include the answer 44 in the selected table 42. The aggregation operation includes a sum, an average, a minimum value, a maximum value, and/or a count. In some implementations, the highlight model 50 may provide an output 54 of the answer 44 with the aggregation in response to detecting a hover over the selected table 42.

The highlight model 50 may provide an output 54 with the selected documents 48 with the highlight 52 applied to the cells of the selected table 42 with the answer 44 to the query 28. As such, in response to providing the query 28, the user 106 receives the output 54 with the highlight 52 applied to one or more cells with the answer 44 to the query 28. The highlight 52 may visually distinguishes the one or more cells identified as containing the answer 44 to the query 28 or being related to the answer 44 of the query 28 so that a user may easily identify the one or more cells relative to other information in the selected document 48.

The method 400 may be used to search within cells of tables within documents for answers to natural language questions. The method 400 may reduce an amount of time to locate an answer to a question by automatically locating the answer in the tables within documents instead of the user 106 processing and reading through several documents to find the answers.

Figure 5:
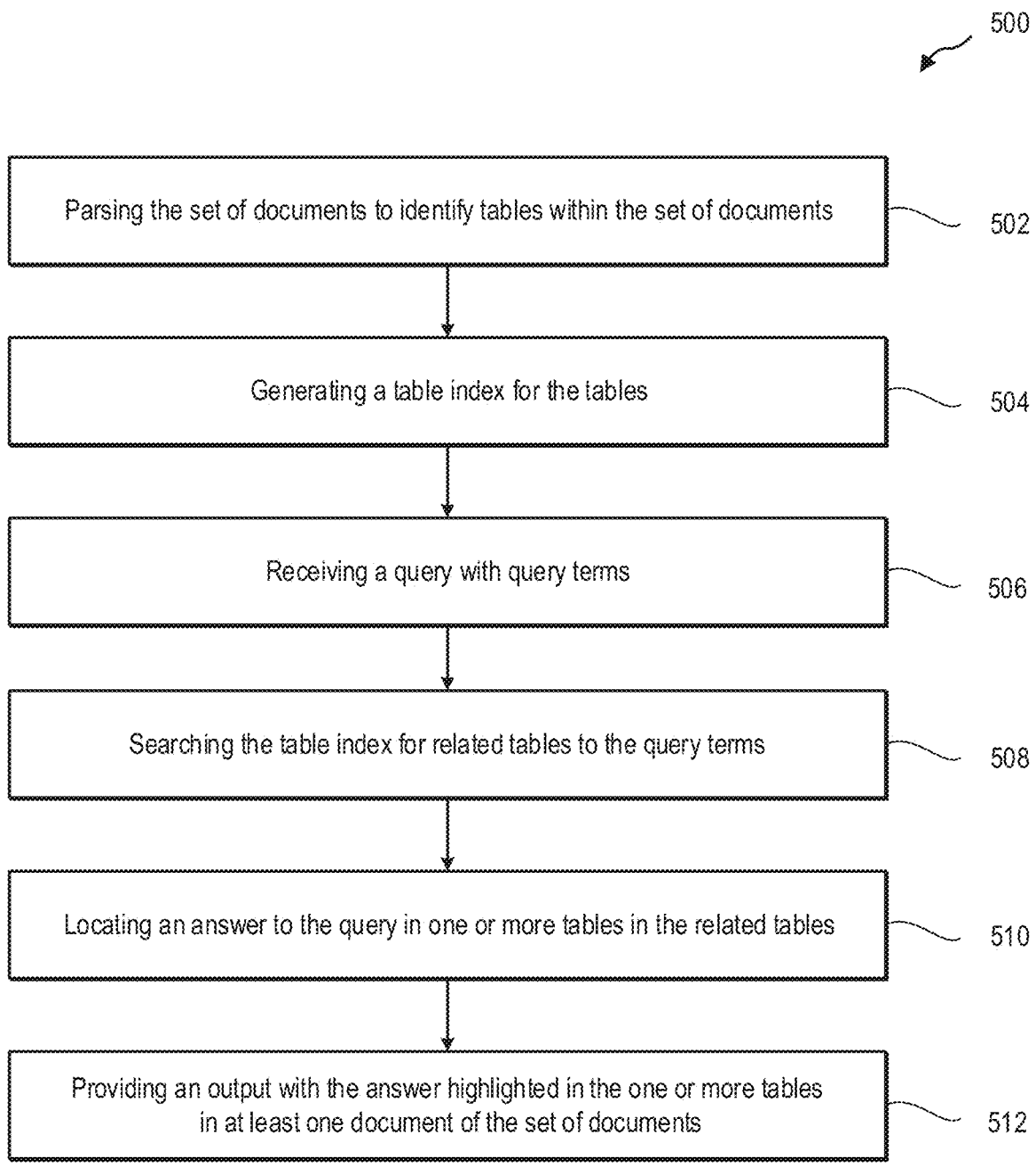
FIG. 5 illustrates an example method for generating a table index and using the table index to search for tables with answers to queries within documents in accordance with implementations of the present disclosure.

Referring now to FIG. 5, illustrated is an example method 500 for generating a table index and using the table index to search for tables with answers to queries within documents. The actions of the method 500 are discussed below with reference to the architecture of FIG. 1.

At 502, the method 500 includes parsing a set of documents to identify tables within the set of documents. A parser model 12 obtains the documents 10 and extracts the content of the documents 10 to identify one or more tables 14 within the documents 10. In addition, the parser model 12 parses the set of documents (e.g., the documents 10) and identifies table metadata 16 for the tables 14. The table metadata 16 includes coordinate values for cells for the table 14, text or values for the cells of the table 14, a number of rows of the table 14, a number of columns of the table 14, location information for the table 14, headings in the table 14, a title of the table 14, captions for the table 14, and/or a document ID 18 of a document 10 that includes the table(s) 14. As such, the table metadata 16 may include any information regarding the table 14.

At 504, the method 500 includes generating a table index for the tables. A table to text model 20 obtains the tables 14 and the table metadata 16 identified by the parser model 12. The table to text model 20 creates text entries 22 for each table 14 and produces a table index 24 that may be searched. The text entries 22 provide a mechanism to search the table 14 based on the content of the table 14. The text entries 22 provide a context to the information (e.g., text, values, and/or images) within the cells of the table 14. For example, the text entries 22 provide a description of the information contained within in the row or column. The text entries 22 may be used to identify a structure of the table 14 and/or the relationships between the rows and columns. The text entries 22 may use captions, titles, and/or headings to provide context to the information within the cells of the table 14. As such, the table index 24 converts the tables 14 into searchable text by providing a plurality of text entries 22 for the tables 14 that provides a description of information of the tables 14 or provides a context of information of the tables 14. The table index 24 also stores the table metadata 16 of the tables 14 with the text entries 22.

The text entries 22 are used to produce a table index 24 that may be searched based on the content (e.g., the information in the cells) of the table 14 and/or a context of the table 14. The table to text model 20 converts every table 14 identified by the parser model 12 into a table index 24. Each table 14 identified by the parser model 12 may include a plurality of text entries 22. As such, each table 14 is saved in multiple ways using different text entries 22 to provide a description of the information contained within each cell of the table 14. Moreover, by saving the table 14 in multiple forms, the table 14 has a higher chance of overlap with query terms 30.

At 506, the method 500 includes receiving a query with query terms. The query 28 is a natural language query. A search model 26 receives a query 28 with query terms 30 from a user 106. The query terms 30 may form a question that the user 106 is asking.

At 508, the method 500 includes searching the table index for related tables to the query terms. The search model 26 accesses the table index 24 associated with the document set 32 and executes a search on the table index 24 using the query terms 30. The search model 26 compares the query terms 30 to the text entries 22 in the table index 24 to identify one or more related tables 38 to the query terms 30. The related tables 38 may be a subset of the tables 14 that may have an answer to the query 28.

In some implementations, the table index 24 is generated for a set of documents (e.g., documents 10 or document set 32). The set of documents include a portable document format (PDF) with a table or any text document with a table. In some implementations, the set of documents (e.g., documents 10 or document set 32) is identified with the query 28.

The table index 24 converts tables 14 identified in the set of documents (e.g., documents 10 or document set 32) into searchable text using a plurality of text entries 22 for each table 14. The text entries 22 provide a mechanism to search the table 14 based on the content of the table 14. The text entries 22 provide a context to the information (e.g., text, values, and/or images) within the cells of the table 14. For example, the text entries 22 provide a description of the information contained within in the row or column. The text entries 22 may be used to identify a structure of the table 14 and/or the relationships between the rows and columns. The text entries 22 may use captions, titles, and/or headings to provide context to the information within the cells of the table 14. The text entries 22 are used to produce a table index 24 that may be searched based on the content (e.g., the information in the cells) of the table 14 and/or a context of the table 14.

In some implementations, the search model 26 provides a relevance score 36 for the related tables 38 that indicates a confidence level that the query terms 30 match words or values included in the plurality of text entries 22 for the related tables 38 or that the query terms 30 are similar to the one or more text entries 22 for the related tables 38. The related tables 38 may be related to the query terms 30 based on determining that the relevance score 36 is equal to a threshold level or exceeds the threshold level.

At 510, the method 500 includes locating an answer to the query in one or more tables in the related tables. In some implementations, the related tables 38 are provided to a table question answering model 40 to locate the answer 44 to the query 28 in one or more tables (e.g., the selected table 42). The table question answering model 40 is a deep learning machine learning model. In some implementations, the related tables 38 are provided to the table question answering model 40 in response to the relevance score 36 exceeding a threshold level.

The table question answering model 40 understands the semantics of the question in the query 28 and the relations and semantic information in the related tables 38. The table question answering model 40 analyzes the related tables 38 to determine whether the cells of the related tables 38 contain an answer 44 to the query 28. As such, the table question answering model 40 locates the answer 44 in the form of cells within the related tables 38. For each related table 38, the question answering model 38 analyzes the content of the cells based on the relationship and/or a context of the cell to determine whether the cell provides an answer 44 to the query 28.

In some implementations, the table question answering model 40 identifies relationships between different cells of the selected tables 42 based on a position of the cells in the selected tables 42. The table question answering model 40 analyzes the text or values of the cells based on the relationships to determine if the cells provide the answer 44 to the query 28. The table question answering model 40 may provide an answer score 46 that indicates a confidence level that the answer 44 is a correct result to the query 28. In some implementations, the table question answering model 40 provides the highlight model 50 an identification of a table (e.g., the selected table 42) with one or more cells that include the answer 44 in response to the answer score 46 exceeding a threshold level.

At 512, the method 500 includes providing an output with the answer highlighted in the one or more tables in at least one document of the set of documents. A highlight model 50 receives the selected tables 42 and the identified cells of the selected tables 42 that include the answer 44 or are related to the answer 44. For example, the highlight model 50 receives a table ID and a cell ID of the selected tables 42 and the identified cells that contain the answer 44. The highlight model 50 obtains the table metadata 16 for the selected tables 42.

The highlight model 50 uses the table metadata 16 to identify a coordinate location of one or more cells with the answer 44 in the selected table 42 in the document (e.g., the selected document 48) to determine a position of the cells in the selected document 48. The highlight model 50 applies a highlight 52 to the cells of the selected table 42 in the document (e.g., the selected document 48) based on the determined position of the cells to visually distinguish the answer 44 in the cells. The highlight 52 includes applying a color overlay on the one or more cells, providing an underline, applying a border to the cells, changing a color of text or values of the cells, and/or bolding the text or values of the cells.

The highlight model 50 may provide an output 54 with the selected documents 48 with the highlight 52 applied to the cells of the selected table 42 with the answer 44 to the query 28. As such, in response to providing the query 28, the user 106 receives the output 54 with the highlight 52 applied to one or more cells with the answer 44 to the query 28. The highlight 52 may visually distinguish the one or more cells identified as containing the answer 44 to the query 28 or being related to the answer 44 of the query 28 so that a user may easily identify the one or more cells relative to other information in the selected document 48.

The method 500 may be used to generate a table index 24 to use in searching for tables (e.g., the selected table 42) with answers 44 to queries 28 within the documents (e.g., the selected documents 48 from the documents 10). The table index 24 improves the searching of tables 14 within documents 10 for answers 44 to queries 28.

Figure 6:
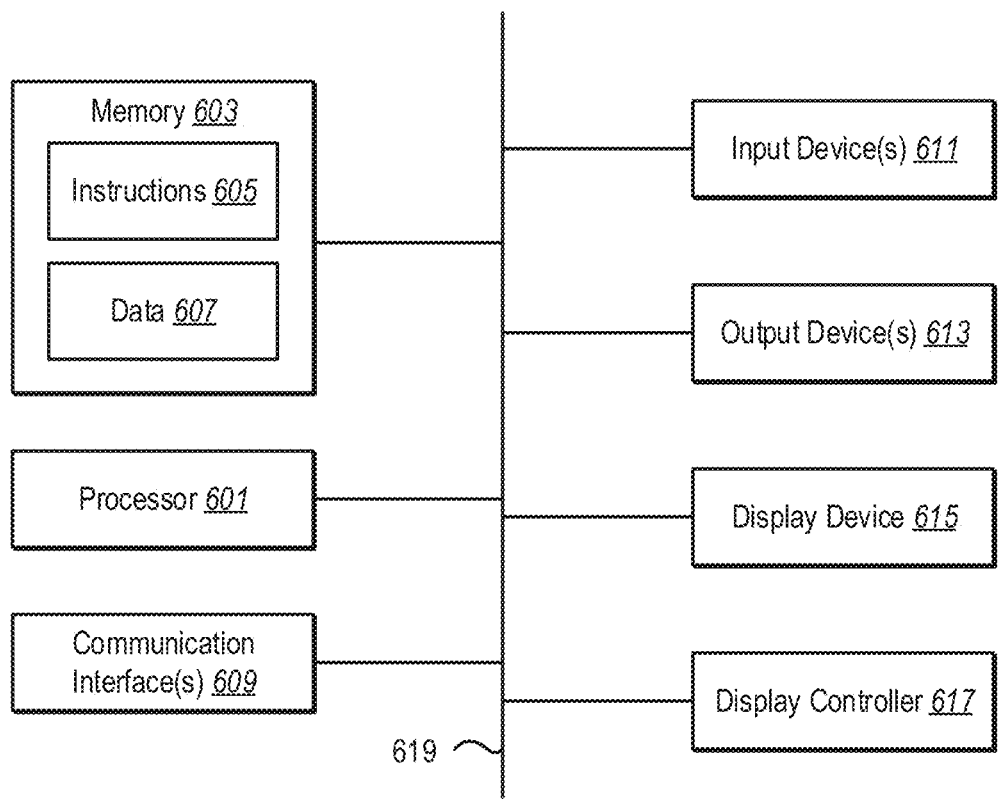
FIG. 6 illustrates components that may be included within a computer system.

FIG. 6 illustrates components that may be included within a computer system 600. One or more computer systems 600 may be used to implement the various methods, devices, components, and/or systems described herein.

The computer system 600 includes a processor 601. The processor 601 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of models and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB) 619, an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with implementations disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a transformer model, a classification model, a regression model, a language model, an object detection model) that can be tuned (e.g., trained) based on training input to approximate unknown functions. For example, a machine learning model may refer to a neural network (e.g., a transformer neural network, a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as models, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. Unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   identifying tables obtained from a set of documents;
   creating text entries for each table, wherein the text entries provide different descriptions of information contained in each cell of the table;
   receiving a query with query terms;
   searching the text entries in a table index for related tables with a percentage of words matching the query terms, wherein the table index includes a document identification where each related table is located in the set of documents;
   locating, using the text entries in combination with a context of a cell, an answer to the query in one related table;
   using the document identification to identify a document where the one related table is located; and
   providing an output with the answer highlighted in the one related table in the document in response to a confidence level indicating that the answer is a correct result to the query exceeding a threshold level.

2. The method of claim 1, wherein the query is a natural language query.

3. The method of claim 1, wherein the set of documents include a portable document format (PDF) with a table or any text document with a table.

4. The method of claim 1, wherein the table index converts the tables identified in the set of documents into searchable text.

5. The method of claim 1, wherein the set of documents is identified with the query.

6. The method of claim 1, further comprising:
   providing the related tables to a table question answering model to locate the answer to the query in the one related table, wherein the table question answering model is a deep learning machine learning model.

7. The method of claim 6, wherein the table question answering model analyzes text or values of different cells of the related tables based on a position of the cells in the related tables and relationships of the cells to determine if the cells provide the answer to the query.

8. The method of claim 6, further comprising:
   providing an answer score that indicates a confidence level that the answer is a correct result to the query; and providing the output with the answer highlighted in the one related table in response to the answer score exceeding a threshold level.

9. The method of claim 6, further comprising:
providing a relevance score for the related tables that indicates a confidence level that the related tables include the query terms or include text similar to the query terms; and
providing the related tables to the table question answering model in response to the relevance score exceeding a threshold level.

10. The method of claim 1, further comprising:
using table metadata to identify a coordinate location of one or more cells with the answer in the one related table in the document; and
applying a highlight to the one or more cells of the one related table in the document based on the table metadata to visually distinguish the answer in the one or more cells.

11. The method of claim 10, wherein the highlight includes applying a color overlay on the one or more cells, providing an underline, or changing a color of text or values of the one or more cells.

12. The method of claim 1, further comprising:
applying an aggregation of two or more cells that include the answer in the one related table, wherein the aggregation includes a sum, an average, a minimum value, a maximum value, or a count; and
providing the output of the answer with the aggregation in response to detecting a hover over the one related table.

13. A method, comprising:
parsing a set of documents to identify tables within the set of documents;
creating text entries for each table, wherein the text entries provide different descriptions of information contained in each cell of the table;
generating a table index with the text entries for the tables, wherein each table in the table index includes a document identification where each table is located in the set of documents and a plurality of text entries that provide a description of information contained in each cell of the table;
receiving a query with query terms;
searching the text entries in the table index for related tables with a percentage of words matching the query terms;
identifying a document subset based on the document identifications of the related tables;
locating, using the text entries in combination with a context of a cell, an answer to the query in one or more tables in the related tables in the document subset;
using the document identification to identify at least one document of the document subset where the one or more tables is located; and
providing an output with the answer highlighted in the one or more tables in at least one document of the set of documents.

14. The method of claim 13, wherein parsing the set of documents identifies table metadata for the tables.

15. The method of claim 14, wherein the table metadata includes one or more of coordinate values for cells for the tables, text or values for the cells of the tables, or a document identification of a document that includes a table.

16. The method of claim 13, wherein the text entries provide a context of information of the tables.

17. The method of claim 13, further comprising:
providing a relevance score for the related tables that indicates a confidence level that the query terms match words or values included in the text entries for the related tables or that the query terms are similar to the text entries for the related tables, wherein the related tables are related to the query terms based on determining that the relevance score is equal to a threshold level or exceeds the threshold level.

18. The method of claim 13, wherein locating the answer to the query further comprises:
identifying relationships between different cells of the one or more tables based on a position of the cells in the one or more tables; and
analyzing text or values of the cells based on the relationships to determine if the cells provide the answer to the query.

19. The method of claim 13, further comprising:
providing an answer score that indicates a confidence level that the answer is a correct result to the query; and
providing the output with the answer highlighted in the one or more tables in response to the answer score exceeding a threshold level.

20. The method of claim 13, further comprising:
using table metadata to identify a coordinate location of one or more cells with the answer in the one or more tables in a document; and
applying a highlight to the location of the one or more cells to visually distinguish the answer in the one or more cells.

* * * * *